A. FRESCHL.
SPARE TIRE HOLDER.
APPLICATION FILED OCT. 15, 1913.

1,098,103.

Patented May 26, 1914.

2 SHEETS—SHEET 1.

WITNESSES
Robert N. Van Dislands
Agnes M. Hipkins

INVENTOR
Alfred Freschl
BY
Ralzemond A. Parker
ATTORNEY

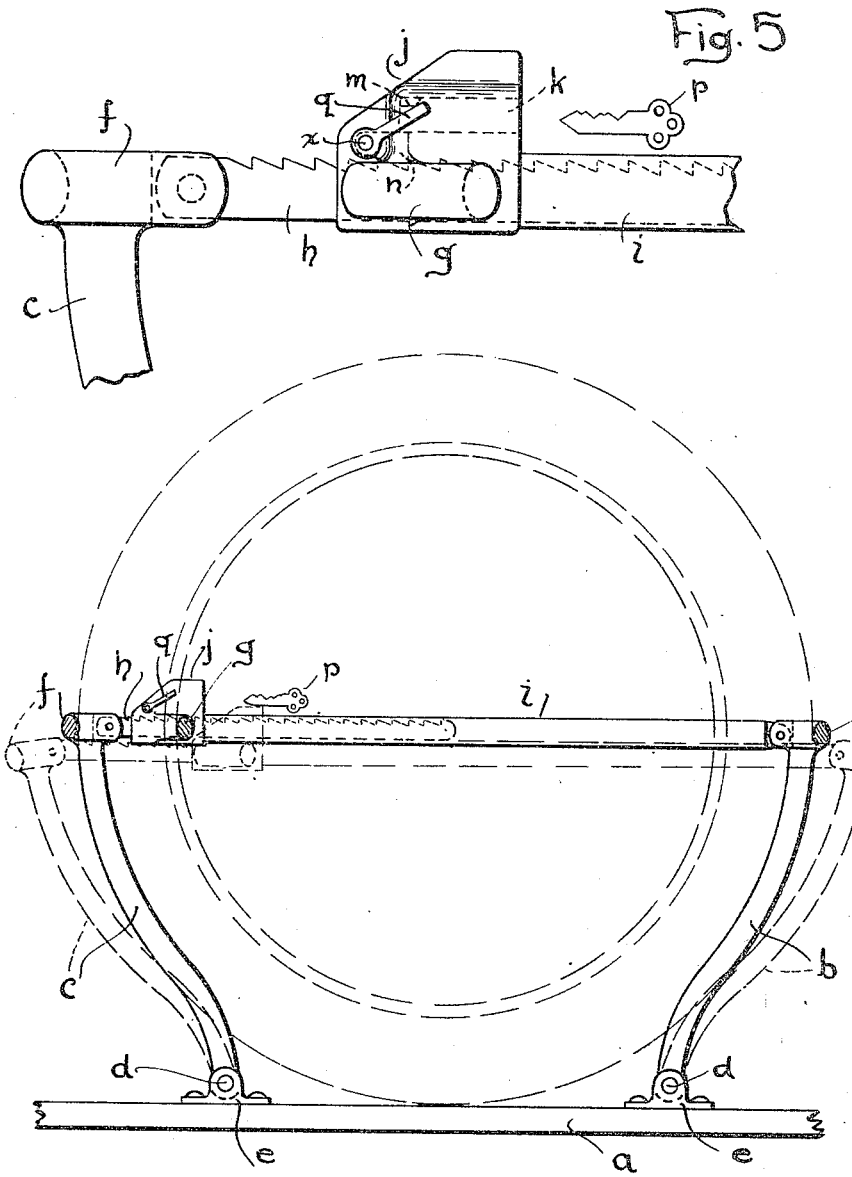

UNITED STATES PATENT OFFICE.

ALFRED FRESCHL, OF DETROIT, MICHIGAN.

SPARE-TIRE HOLDER.

1,098,103.   Specification of Letters Patent.   Patented May 26, 1914.

Application filed October 15, 1913.   Serial No. 795,195.

*To all whom it may concern:*

Be it known that I, ALFRED FRESCHL, a citizen of the United States, residing at Detroit, county of Wayne, State of Michigan, have invented a certain new and useful Improvement in Spare-Tire Holders, and declare the following to be a full, clear, and exact description of the same, such as will enable others skilled in the art to which it pertains to make and use the same, reference being had to the accompanying drawings, which form a part of this specification.

This invention relates to spare tire holders, and has for its object a spare tire holder that does away with straps and which may be applied to tires of any size. The tire may be locked in place so as to prevent theft.

Figure 4:
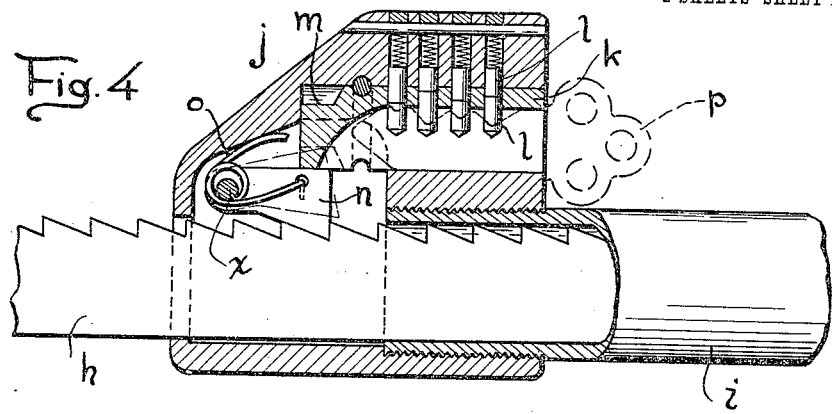
Figure 1:
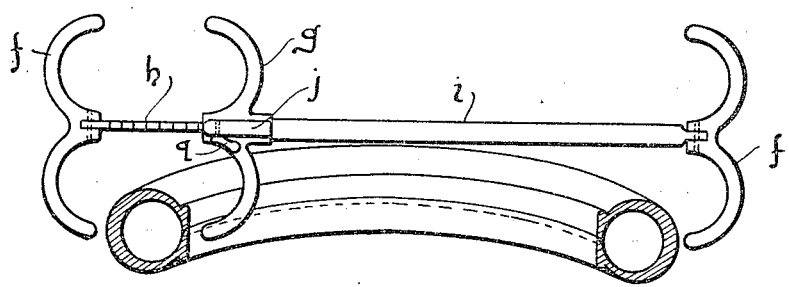
Figure 2:
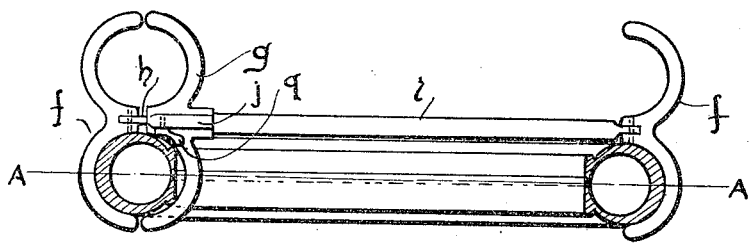

In the drawings: Figure 1, is a plan view of the holder showing a half section of the tire, the tire and holder being shown in position for the insertion of the former. Fig. 2, is a plan view of the holder showing the same holding the tire. Fig. 3, is a section on the line A—A of Fig. 2, the tire being shown in dotted lines. There is also a dotted-line showing of the holder in the position to which it can be opened to allow insertion of the tire. Fig. 4, is a sectional detail of the lock that I employ. Fig. 5, is an enlarged side elevation of two adjacent half-ring elements, one carrying the lock.

The spare tire holder may be carried upon the running board $a$ of an automobile, or, of course, it might be carried in other positions. Two upright arms $b$ and $c$ are pivotally supported in the clips $e$ by laterally projecting studs $d$. However, any other hinging connection might be used. These arms are preferably bent to follow the arc of the tire for some distance. At the top of each is either one or more half-rings which are adapted to partially encircle and hold the tire and which will be termed the half-ring elements merely for the purpose of description and not limitation. A pair of half-rings $f$ is shown in the drawings, as the spare tire holder illustrated is intended to hold two tires. A second half-ring element $g$ is attached to the lock $j$ which is held on the end of the tube $i$.

The half-ring elements that are attached to the upright arms are connected, a rack or transverse member $h$ being fastened to the left half-ring element shown in the drawings and a tube $i$ being attached to the right half-ring element, shown in the drawings.

The rack $h$ telescopes into the tube $i$ (Fig. 4). However, this is not essential, for a bar might be used in place of the tube and the two held together by the lock element. This lock element is shown at $j$ (Fig. 4) and comprises a casing that is screw-threaded onto the end of the tube $i$. The rack $h$ passes through a slot in the casing and into the tube $i$. The inside of the lock element is preferably recessed for a Yale lock provided with the usual cylinder $k$ and the divided plungers $l$. The side of the cylinder near the inside end is cut away as at $m$. A pawl $n$ is pressed against the teeth of the rack $h$ by the spring $o$. The pawl lies just at the side of the cylinder $k$ when it is in engagement with the teeth of the rack. However, when the cylinder is given a half revolution by inserting the proper key, as $p$, the cut-away portion $m$ comes adjacent the pawl $n$. The pawl, however, still engages the rack by reason of the spring $o$, but by turning the lever arm $q$, which is fast to the pin $x$, the pawl may be released so that the rack may be slid into the tube $i$. This it can do by reason of the pivoting of the arm $c$ and by reason of its pivotal connection to the half-ring elements supported by the arm $c$.

Inasmuch as the rack $h$ and the cross element $i$ are both pivoted to the supporting arms, they may be moved relatively. Hence, when the tire is inserted as shown in Fig. 1 and the lock has been turned by the insertion of the key and the pawl has been lifted by the lever, the half-ring element $g$ may be thrust toward the left half-ring element $f$ to clamp the tire and hold it in place. It is therefore apparent that the holder adjusts itself to the size of the tire and that it so locks the tire in that the same cannot be stolen without breaking some of the parts.

What I claim is:

1. A spare tire holder, having in combination, a pair of pivotally supported arms, a half ring element supported on the free end of each arm, a cross element supported on the free end of one arm, a transverse member supported on the free end of the other arm, the said cross element and the said transverse member being arranged to lie adjacent each other in various relative relations and to be separable from each other, a third half ring element supported by the cross element and transverse member, and means for fixing said third half ring element in a definite relation with respect to said element and member and with respect to one of the other half ring elements.

2. A spare tire holder, having in combination, a pair of pivotally supported arms, a half ring element supported on the free end of each arm, a transverse member pivoted on the end of one arm, a cross element pivoted on the end of the other arm, the said cross element and the said transverse element slidably engaging with each other and being separable with respect to each other, a third half ring element carried on the cross element, and locking means carried on the cross element for locking the cross element with respect to the transverse element so as to hold the third half ring element in fixed relation with one of the other half ring elements.

3. The combination of a half-ring element, a rack connected therewith, a second half-ring element, one of said half-ring elements being pivotally supported, a cross element attached to the second half-ring element, and a third half-ring element carried on the end of the cross element and fixable in selected positions with respect to the first-mentioned half-ring element by engaging the teeth of said rack, substantially as described.

4. The combination of a half-ring element, a rack connected therewith, a second half-ring element, one of said half-ring elements being pivotally supported, a cross element connected therewith and slidably engaging with said rack, a third half-ring element attached to the cross element and locking means on said third half-ring element for fixing the relative positions of the rack and the cross element so as to clamp a tire in place, substantially as described.

5. The combination with a half-ring element, a rack connected therewith, a second half-ring element, one of the said half-ring elements being pivotally supported, a cross element attached to the said second half-ring element, a third half-ring element attached to the cross element, a rack held in slidable engagement with respect to the cross element and connected with the first half-ring element, and a pawl held on said third half-ring element for fixing the relation of the third half-ring element with respect to the first half-ring element when the pawl engages the teeth of the rack, substantially as described.

6. The combination of a half-ring element, a second half-ring element, one of said half-ring elements being pivotally supported, a rack connected with the first half-ring element, a cross element being attached to the second half-ring element, the rack and cross element being held in slidable relation, a third half-ring element carried on the cross element, a pawl carried on the third half-ring element and normally engaging the teeth of the rack, and a lock for preventing the pawl being lifted from the teeth of the rack when the lock is set, substantially as described.

7. The combination of a half-ring element, a second half-ring element, one of the first-mentioned half-ring elements being pivotally supported, a rack attached to the first half-ring element, a cross element connected with the second half-ring element, a third half-ring element carried on the cross element, said cross element and rack being held in slidable arrangement, a pawl carried on the third half-ring element and normally engaging the teeth of the rack, a lever for lifting the pawl out of the teeth and a lock for preventing the pawl from being lifted out of the teeth when the lock is set, substantially as described.

8. The combination of a half-ring element, a second half-ring element, one of said half-ring elements being pivotally supported, a rack connected to the first half-ring element, a cross element in the form of a tube connected to the second half-ring element, a third half-ring element attached to the end of the cross tube and being recessed, said rack passing through the recess and into the tube, a pawl spring-pressed against the teeth of the rack within the recess of the third half-ring element, means for lifting the pawl out of the teeth against the resistance of the spring and a lock provided with a revolving barrel having a cut-away portion, whereby when the lock is in a given position the pawl may be lifted and released from the rack and when the lock is set the pawl is prevented from being lifted from the rack, substantially as described.

In testimony whereof, I sign this specification in the presence of two witnesses.

ALFRED FRESCHL.

Witnesses:
STUART C. BARNES,
MARIETTA E. RUDD.